(12) United States Patent
Yamazaki et al.

(10) Patent No.: US 10,211,439 B2
(45) Date of Patent: Feb. 19, 2019

(54) CYLINDRICAL BATTERY

(71) Applicant: FDK Energy Co., Ltd., Kosai-shi, Shizuoka (JP)

(72) Inventors: Tatsuya Yamazaki, Kosai (JP); Shigeyuki Kuniya, Kosai (JP)

(73) Assignee: FDK Corporation, Tokyo (JP)

( * ) Notice: Subject to any disclaimer, the term of this patent is extended or adjusted under 35 U.S.C. 154(b) by 148 days.

(21) Appl. No.: 15/084,623

(22) Filed: Mar. 30, 2016

(65) Prior Publication Data

US 2016/0293916 A1    Oct. 6, 2016

(30) Foreign Application Priority Data

Mar. 31, 2015  (JP) ................................. 2015-073854

(51) Int. Cl.
| | | |
|---|---|---|
| *H01M 2/12* | (2006.01) | |
| *H01M 2/02* | (2006.01) | |
| *H01M 2/04* | (2006.01) | |
| *H01M 2/34* | (2006.01) | |
| *H01M 6/06* | (2006.01) | |

(52) U.S. Cl.
CPC ......... *H01M 2/1235* (2013.01); *H01M 2/022* (2013.01); *H01M 2/0413* (2013.01); *H01M 2/1252* (2013.01); *H01M 2/34* (2013.01); *H01M 6/06* (2013.01); *H01M 2200/00* (2013.01)

(58) Field of Classification Search
CPC .. H01M 2/1235; H01M 2/022; H01M 2/0413; H01M 2/1252; H01M 2/34; H01M 6/06; H01M 2220/00
See application file for complete search history.

(56) References Cited

U.S. PATENT DOCUMENTS

| | | | | |
|---|---|---|---|---|
| 9,620,751 | B2 * | 4/2017 | Kim ..................... | H01M 2/1241 |
| 2009/0061310 | A1 * | 3/2009 | Kim ..................... | H01M 2/0413 |
| | | | | 429/185 |
| 2012/0315513 | A1 * | 12/2012 | Ro ....................... | H01M 2/0413 |
| | | | | 429/53 |

FOREIGN PATENT DOCUMENTS

| | | |
|---|---|---|
| JP | 07-14555 U | 3/1995 |
| JP | 2012-59616 A | 3/2012 |

OTHER PUBLICATIONS

Suzuki et al. (JP, 2012-059616) (a raw machine translation) (Abstract, Detailed Description and Drawings) (Mar. 22, 2012).*

* cited by examiner

*Primary Examiner* — Carmen V Lyles-Irving
(74) *Attorney, Agent, or Firm* — Harness, Dickey & Pierce, P.L.C.

(57) ABSTRACT

In a cylindrical battery including a gap formed between a peripheral side surface 32*b* of a dish-shaped portion in an anode terminal plate 32 and a curved end portion 11*a* of a cathode can 11, and a washer 50 having a cylindrical boss portion 50*a* and an annular flange portion 50*c* provided around an upper end surface of the cylindrical boss portion 50*a* the washer 50 being mounted to an opening portion of a cathode can 11 such that the cylindrical boss portion 50*a* is fitted into the gap 201, a vent structure configured to release gas released to the gap 201 from a first vent hole 32*c* in the anode terminal plate 32 to an exterior of the cylindrical battery (1) from an arc-shaped second vent hole (50*d*) formed in the flange portion(50*c*) or an annular gap (301, 302) formed between the upper end surface of the cylindrical boss portion (50*a*) and the terminal plate(32).

4 Claims, 13 Drawing Sheets

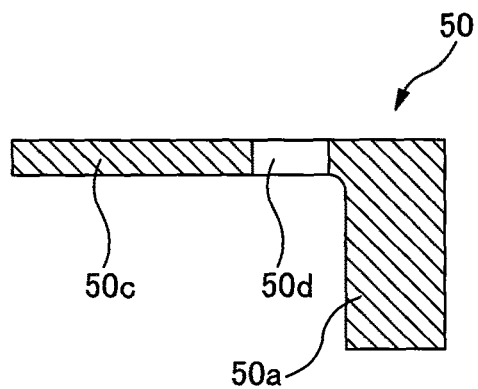
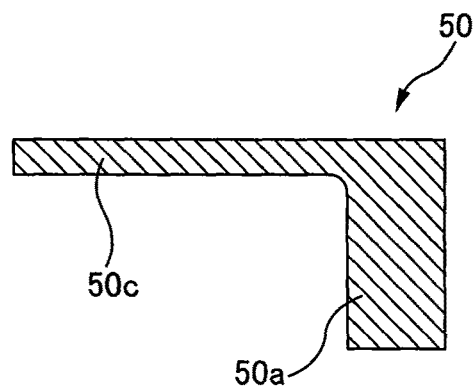
FIG. 5A
FIG. 5B
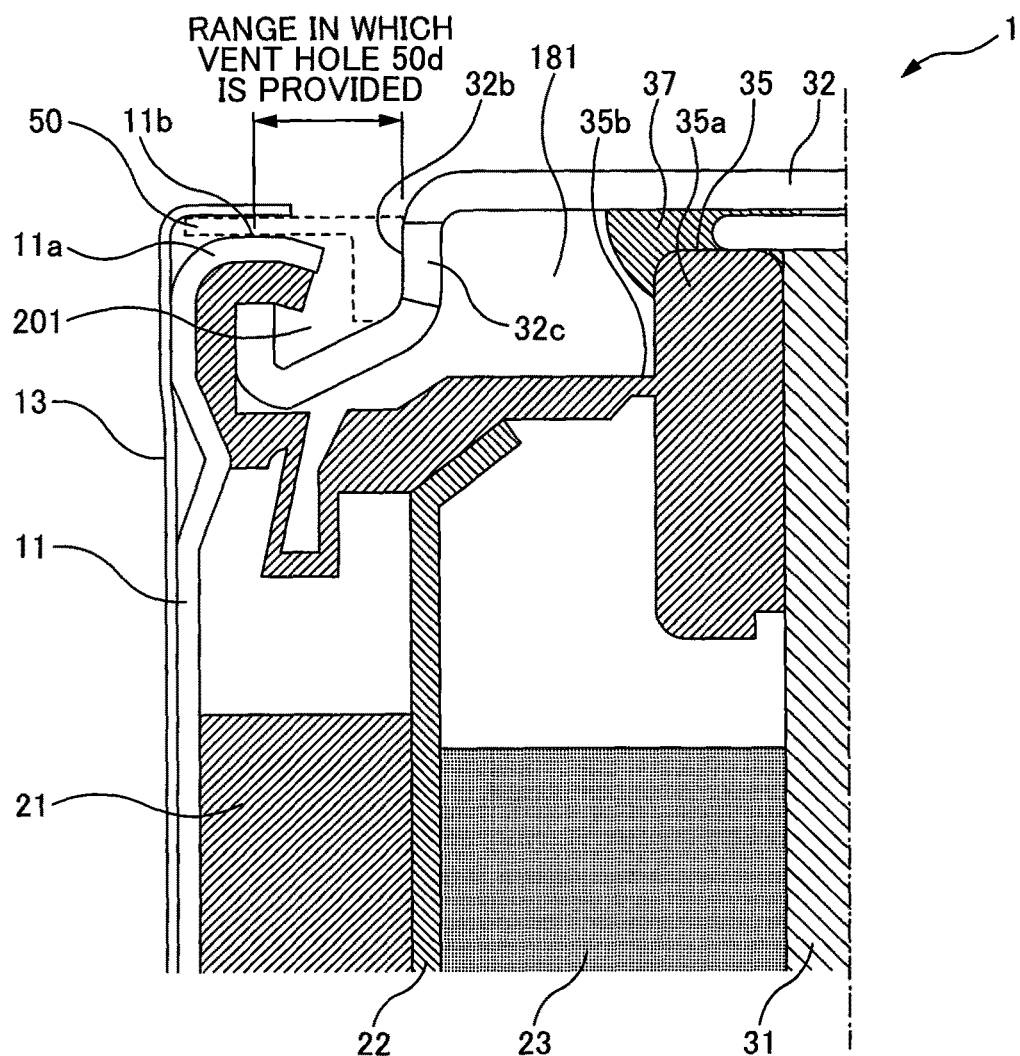
FIG. 6

CYLINDRICAL BATTERY

CROSS-REFERENCE TO RELATED APPLICATION

This application claims the benefit of priority to Japanese Patent Application No. 2015-073854, filed Mar. 31, 2015, of which full contents are incorporated herein by reference.

BACKGROUND OF THE INVENTION

Field of the Invention

The present invention relates to a safety mechanism of a cylindrical battery.

Description of the Related Art

FIGS. 17 to 20 illustrate a structure of an alkaline battery 100 (cylindrical alkaline battery of type LR6). In these drawings, FIG. 17 is a longitudinal sectional view illustrating the alkaline battery 100 when a direction extending the cylindrical axis of the alkaline battery 100 is defined as a longitudinal direction, and FIG. 18 is an enlarged view illustrating an anode terminal plate and therearound of the alkaline battery 100 in FIG. 17.

As illustrated in FIG. 17, the alkaline battery 100 includes: a metal cathode can 11 in a bottomed cylindrical shape; a cathode mixture 21 in an annular shape, a bottomed cylindrical separator 22 provided in the inner side the cathode mixture 21, an anode mixture 23 (anode gel), containing zinc alloy, with which the inner side of the separator 22 is filled, an anode current collector 31 that inserted into the anode mixture 23, an anode terminal plate 32 having an appearance of a substantially dish-shape that is provided to an opening of the cathode can 11, a sealing gasket 35 provided below the anode terminal plate 32 when the opening of the cathode can 11 is placed upward, a washer 50 attached around the outer periphery of a peripheral side surface 32b of the anode terminal plate 32; and the like. Among the above, the cathode mixture 21, the separator 22, and the anode mixture 23 constitute power generation elements of the alkaline battery 100 in the presence of an alkaline electrolyte.

As illustrated in FIG. 18, a thin-walled portion 35b is formed in the sealing gasket 35. When the internal pressure of the alkaline battery 100 is increased for some reason, the thin-walled portion 35b is broken prior to other parts of the sealing gasket 35, so that the gas blowing out from such a broken part to a space 181 between the anode terminal plate 32 and the sealing gasket 35, is released through a vent hole 32c, provided in the peripheral side surface 32b of a dish-shaped portion in the anode terminal plate 32, to the outside of the space 181.

The washer 50 is provided for the purpose of restraining short circuit (preventing short circuit between the anode terminal plate 32 and the cathode can 11) and the like. FIGS. 19 and 20 illustrate a structure of a washer 50. FIG. 19 is a plan view illustrating the washer 50 when seen from the opening of the cathode can 11, and FIG. 20 is a perspective view illustrating the washer 50. As illustrated in these drawings, the washer 50 is in such a shape that a flange portion 50c is formed on the upper end surface of a flat hollow cylindrical washer boss portion 50a.

Here, as illustrated in FIG. 18, the gas blowing out form the broken part of the thin-walled portion 35b passes from the vent hole 32c through a narrow gap between components to the outside, as indicated by arrows in the drawing. Therefore, when a large amount of gas is generated inside the battery for some reason, releasing of the gas may be too late, which may increase the pressure of the gas, to detach the washer 50.

As a technique for preventing such detachment of the washer 50, for example, Japanese Patent Application Laid-open Publication No. 2012-59616 describes that a notch portion is formed on a cylindrical side surface of a barrel portion of a washer, and a part of the pressure applied to the inside of the barrel portion of the washer is released, to prevent the washer itself from flying (being detached). Further, Unexamined Utility Model Application Publication No. 7-14555 describes that an insulating washer is formed such that the greater the force of the insulating washer being detached from an anode terminal becomes, the greater the contact resistance between the insulating washer and a rising portion of the anode terminal becomes.

As described above, from the safety point of view, the above washer 50 constituting the alkaline battery 100 needs to be structured in such a manner as not to be detached even if a large amount of gas is generated inside a battery for some reason. However, from the view point of improvement of productivity, the above washer 50 needs to be structured considering the ease of forming and the certainty of forming (improvement in yield).

The present disclosure has been made from such view points, and an object thereof is to provide a cylindrical battery excellent in safety and productivity.

SUMMARY OF THE INVENTION

A cylindrical battery according to an aspect of the present disclosure includes: a bottomed cylindrical battery can in which power generation elements are placed; a terminal plate having an appearance of a substantially dish shape, the terminal plate having an end portion formed on its periphery; a sealing gasket having an end portion formed on its periphery; and a washer, the sealing gasket being provided below the terminal plate when an opening of the battery can is placed upward, the terminal plate and the sealing gasket being provided to the opening of the battery can, with the end portions of the terminal plate and the sealing gasket being subjected to a swaging process together with an end portion of the battery can, the terminal plate including a peripheral side surface of a dish-shaped portion thereof, the battery can including the end portion curved, by the swaging process, to a direction of a cylindrical axis of the battery can, the peripheral side surface and the end portion of the battery can forming a gap therebetween, the washer including a cylindrical boss portion and an annular flange portion provided to a periphery of an upper end surface of the boss portion, the washer being mounted to an opening portion of the battery can with the boss portion being fitted into the gap, the terminal plate including the peripheral side surface having a portion facing the gap, the portion facing the gap having formed therein a first vent hole to release gas in a space between the terminal plate and the sealing gasket, the battery can including the end portion having an edge portion curved slightly downward by the swaging process, the washer including a vent structure provided in a range surrounded by a circular ridge line and the peripheral side surface of the terminal plate, in a state where the washer is mounted to the opening portion of the battery can, the circular ridge line connecting a highest part of the curved end portion of the battery can, the vent structure being configured to release gas flowing from the first vent hole to the gap, to an exterior of the cylindrical battery.

Another aspect of the present disclosure is the cylindrical battery, in which the washer includes, as the vent structure, a second vent hole near the boss portion in the flange portion, the second vent hole extending with a predetermined length along an outer peripheral surface of the boss portion.

Another aspect of the present disclosure is the cylindrical battery, in which the washer includes a plurality of second vent holes provided, at predetermined intervals, along the outer peripheral surface of the boss portion, the second vent hole including the plurality of second vent holes.

Another aspect of the present disclosure is the cylindrical battery, in which a gross area (projected area) of at least one second vent hole when the opening portion of the battery can is seen in a direction of the cylindrical axis of the battery can, is from 7 to 20% of an area (projected area) of a planar region surrounded by the circular ridge line and the peripheral side surface of the terminal plate, when the opening portion of the battery can is seen in the direction of the cylindrical axis, the circular ridge line connecting the highest part of the curved end portion of the battery can, the second vent hole being provided near the boss portion in the flange portion as the vent structure, the second vent hole extending with a predetermined length along an outer peripheral surface of the boss portion.

Another aspect of the present disclosure is the cylindrical battery, in which the washer includes, as the vent structure, a protruding portion formed on an inner peripheral surface of the boss portion Another aspect of the present disclosure is the cylindrical battery, in which the washer includes a plurality of protruding portions provided, at predetermined intervals, along the inner peripheral surface of the boss portion, the protruding portion including the plurality of protruding portions.

Another aspect of the present disclosure is the cylindrical battery, in which the washer includes, as the vent structure, a recessed portion formed on an inner peripheral surface of the boss portion.

Another aspect of the present disclosure is the cylindrical battery, in which the washer includes a plurality of recessed portions provided, at predetermined intervals, along the inner peripheral surface of the boss portion, the recessed portion including the plurality of recessed portions.

Another aspect of the present disclosure is the cylindrical battery, in which an area (projected area) of a gap formed between the peripheral side surface of the dish-shaped portion in the terminal plate and an inner side surface of the boss portion of the washer, when the opening portion of the battery can is seen in a direction of the cylindrical axis of the battery can, is equal to or larger than 6% of an area (projected area) of a planar region surrounded by the circular ridge line and the peripheral side surface of the terminal plate, when the opening portion of the battery can is seen in the direction of the cylindrical axis, the circular ridge line connecting the highest part of the curved end portion of the battery can.

Other features, problems to be disclosed by the present application, and solutions thereof will become apparent from descriptions of the present specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 5A is an enlarged partial cross-sectional view illustrating a washer 50 of Type 1 taken along line A-A' of FIG. 3;

FIG. 5B is an enlarged partial cross-sectional view illustrating a washer 50 of Type 1 taken along line B-B' of FIG. 3;

FIG. 6 is a diagram illustrating a range in which a vent hole 50d is provided;

DETAILED DESCRIPTION

At least the following details will become apparent from descriptions of the present specification and of the accompanying drawings.

Figure 1:
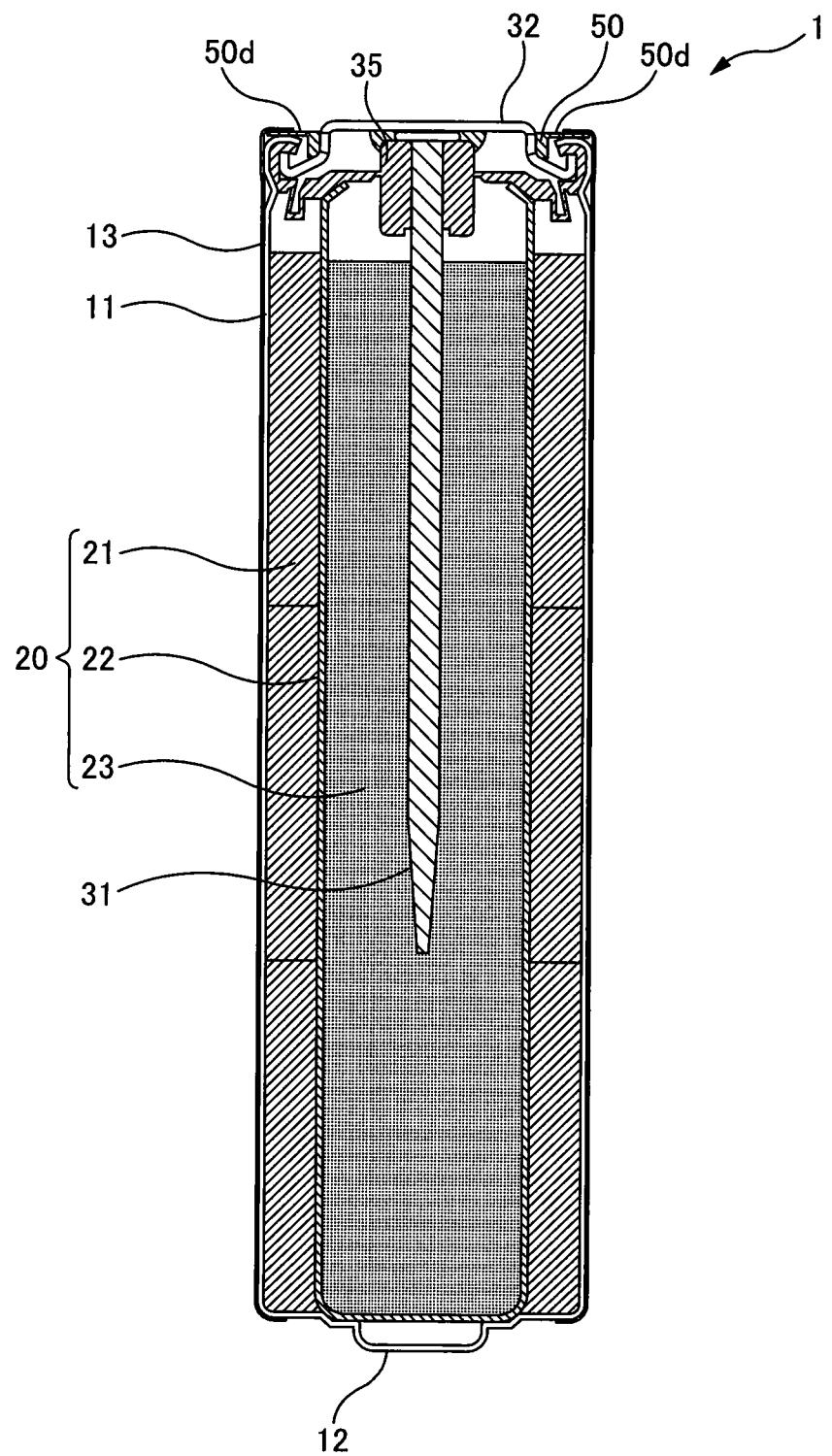
FIG. 1 is a diagram illustrating a structure of an alkaline battery 1.
Figure 2:
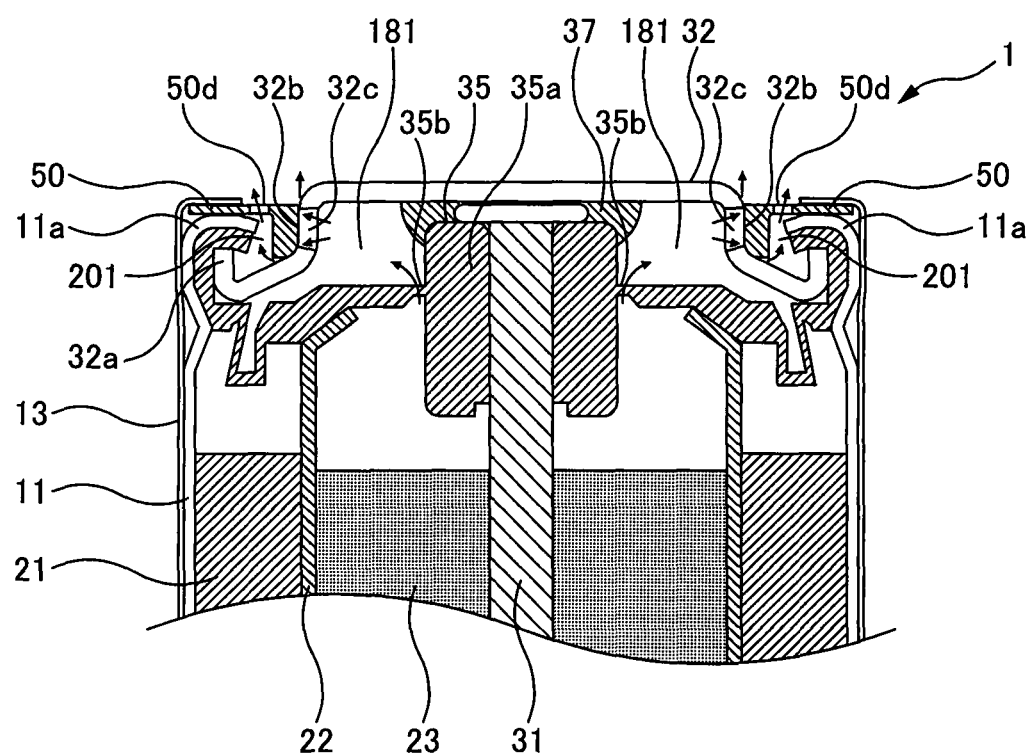
FIG. 2 is an enlarged partial cross-sectional view illustrating an anode terminal plate 32 and therearound of an alkaline battery 1.

FIG. 1 illustrates a structure of a cylindrical alkaline battery (alkaline battery of type LR6 (AA)) (hereinafter, referred to as an alkaline battery 1) as an example of a cylindrical battery of the present disclosure. The drawing is a longitudinal sectional view illustrating the alkaline battery 1 (sectional view when a direction extending the cylindrical axis of the alkaline battery 1 is defined as an up-down (longitudinal) direction). FIG. 2 is an enlarged partial cross-sectional view illustrating an anode side and therearound of the alkaline battery 1 in FIG. 1.

As illustrated in these drawings, the alkaline battery 1 includes: a metal cathode can 11 (battery can) in a bottomed cylindrical shape; a cathode mixture 21 inserted in the cathode can 11; a bottomed cylindrical separator 22 provided on the inner peripheral side of the cathode mixture 21; an anode mixture 23 (anode gel) with which the inner peripheral side of the separator 22 is filled; an anode terminal plate 32 having an appearance of a substantially dish shape and having an outer peripheral end portion 32a formed on the periphery thereof, the anode terminal plate 32 being fitted into an opening portion provided on the upper side of the drawing paper in the cathode can 11, via a substantially disk-shaped sealing gasket 35 (insulator), made of a material having insulating properties such as resin, the anode terminal plate 32 configured to seal the opening portion of the cathode can 11; a rod-shaped anode current collector 31, made of a material such as brass, engaged in a boss portion formed near the center of the sealing gasket 35 (hereinafter, referred to as a gasket boss portion 35a) to be fixedly provided on the inner side of the anode terminal plate 32; a washer 50 (insulating ring) made of a material having insulating properties such as resin; and the like.

The upper end of the anode current collector 31 is in contact with the lower surface of the anode terminal plate 32, and is fixed, together with the sealing gasket 35, to the anode terminal plate 32 by spot welding or the like. The cathode mixture 21, the separator 22, and the anode mixture 23 constitute power generation elements of the alkaline battery 1.

The cathode can 11 is made of a conductive material, using a material obtained by pressing a metal such as a nickel plated steel plate, or the like. The cathode can 11 serves as functions of both a cathode current collector and a cathode terminal, and has, as illustrated in FIG. 1, a protruding cathode terminal portion 12 integrally formed in a bottom portion thereof.

Substantially the entire outer peripheral surface of the cathode can 11 is covered with an insulating jacket label 13. The jacket label 13 is made of an insulating heat-shrinkable resin material such as Polyethylene terephthalate (PET), Polyvinyl chloride (PVC). The jacket label 13 covers the periphery of the cathode can 11 such that, for example, a film made of a resin material adheres to the cathode can 11, with the film being heated to be shrunk after being wrapped around the cathode can 11.

The washer 50 is provided for the purpose of restraining short circuit of the alkaline battery 1 (preventing short circuit between the anode terminal plate 32 and the cathode can 11) and the like. The washer 50 is engaged in the opening portion of the cathode can 11, with the washer boss portion 50a, which will be described later, being fitted into a gap 201 between the anode terminal plate 32 and the washer 50 (by engagement with a peripheral side surface 32b of the dish-shaped portion of the anode terminal plate 32). Note that, when the jacket label 13 covers the periphery of the cathode can 11, a peripheral end of a the flange portion 50c, which will be described later, of the washer 50 is also covered with the jacket label 13. That is, the washer 50 is fixed to the alkaline battery 1 by the jacket label 13 in addition to engagement of the anode terminal plate 32 and the peripheral side surface 32b with each other.

The cathode mixture 21 is formed in an annular shape such that an electrolyte containing, as main components, electrolytic manganese dioxide (EMD) serving as a cathode active material, graphite serving as a conductive material, and potassium hydroxide (KOH), is mixed together with a binder such as polyacrylic acid, and such a mixture is subjected to processing such as rolling, cracking, granulating, classifying, etc., and thereafter is pressed. As illustrated in FIG. 1, in the cathode can 11, the cathode mixture 21 constituted by a plurality of annular pellets is layered in the up-down direction in a manner coaxial with the cylindrical axis of the cathode can 11, and is press-fitted. In the case of the alkaline battery 1 illustrated in the same drawing, three pellets of the cathode mixture 21 are press-fitted into the cathode can 11.

The anode mixture 23 is a mixture obtained by gelling zinc alloy powder serving as an anode active material. The zinc alloy powder is obtained by powdering by a gas atomizing method, a centrifugal spray drying method, etc., and contains: zinc; an alloy element (bismuth, aluminum, indium, etc.) added for the purpose of restraining generation of gas (leak-proof) and the like; and potassium hydroxide (KOH) serving as an electrolyte. The anode current collector 31 is penetrated in the center portion of the anode mixture 23.

As illustrated in FIG. 2, when the opening of the cathode can 11 is placed upward, the sealing gasket 35 is provided below the anode terminal plate 32. The anode terminal plate 32 and the sealing gasket 35 are provided so as to cover the opening of the cathode can 11 such that the outer peripheral end portions thereof are subjected to swaging process while being bent together with an end portion 11a of the cathode can 11. Note that, as illustrated in the drawing, the end portion 11a of the cathode can 11 is bent inward (to a direction of the cylindrical axis) of the cathode can 11 by the swaging process, such that the edge (portion) thereof is curved (curled) slightly downward.

As illustrated in FIG. 2, an annular thin-walled portion 35b is formed near the outer periphery of the gasket boss portion 35a of the sealing gasket 35, for the purpose of explosion proof for the alkaline battery 1. When the internal pressure of the alkaline battery 1 is increased for some reason, the thin-walled portion 35b is broken prior to other parts, so that gas in the interior is released.

One or more vent holes 32c (first vent hole) are provided at predetermined locations of a portion facing the aforementioned gap 201 of the peripheral side surface 32b of the anode terminal plate 32 (for example, four of the vent holes 32c are provided every 90 degrees around the cylindrical axis of the alkaline battery 1).

Figure 3:
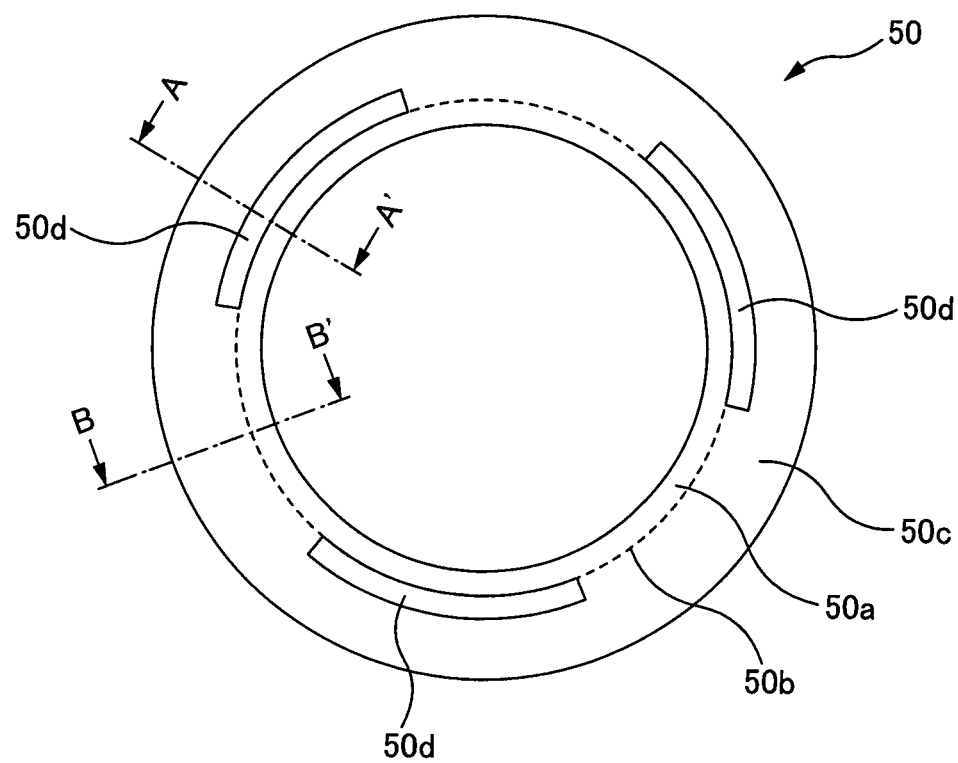
FIG. 3 is a plan view illustrating a washer 50 of Type 1.
Figure 4:
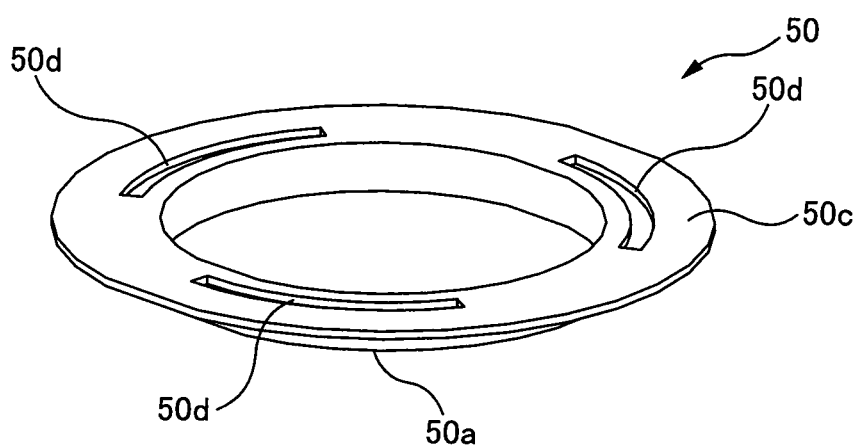
FIG. 4 is a perspective view illustrating a washer 50 of Type 1.

FIGS. 3 to 5A, 5B illustrate a structure of the washer 50 (hereinafter, also referred to as Type 1). FIG. 3 is a plan view illustrating the washer 50 when seen from the direction of the opening of the cathode can 11, and FIG. 4 is a perspective view illustrating the washer 50. Further, FIG. 5A is an enlarged partial cross-sectional view illustrating the washer 50 taken along line A-A' of FIG. 3, and FIG. 5B is an enlarged partial cross-sectional view illustrating the washer 50 taken along line B-B' of FIG. 3. As illustrated in these drawings, the washer 50 is shaped such that a flange portion 50c in a substantially annular shape is provided to the periphery of an upper end surface of the washer boss portion 50a in a flat hollow cylindrical shape. As illustrated in FIGS. 3 to 5A, 5B, three vent holes 50d (second vent hole) in a substantially rectangular shape in cross section, which extend with a predetermined length along an outer peripheral surface 50b of the washer boss portion 50a are provided in the flange portion 50c of the washer 50 at predetermined intervals (at every 120 degrees around the cylindrical axis of the alkaline battery 1).

Here, as indicated by arrows in FIG. 2, the gas blowing out to a space 181 between the anode terminal plate 32 and the sealing gasket 35 when the thin-walled portion 35b of the sealing gasket 35 is broken, passes through a vent hole 32c of the anode terminal plate 32 to the outside of the anode terminal plate 32, and thereafter a part of the gas passes through a narrow gap between the anode terminal plate 32 and the washer 50, to be released to the outside. Whereas, other part of the gas blowing into the space 181 flows into the gap 201 between the anode terminal plate 32 and the washer 50. Then, the gas flowing into the gap 201 is released to the exterior of the alkaline battery 1 through the vent holes 50d (second vent hole).

As such, in the alkaline battery 1 according to an embodiment of the present disclosure, the gas blowing out to the space 181 between the anode terminal plate 32 and the sealing gasket 35 when the thin-walled portion 35b of the sealing gasket 35 is broken, is efficiently released from the vent holes 50d of the washer 50 to the exterior of the alkaline battery 1. Thus, even in a case where a large amount of gas is generated inside the battery for some reason, the washer 50 can be reliably restrained form being detached.

Note that a structure of the washer 50 (Type 1) illustrated in FIGS. 3 and 4 is merely an example, and, as illustrated in FIG. 6, the vent holes 50d may be provided at least in a range surrounded by the peripheral side surface 32b of the anode terminal plate 32 and a circular (annular) ridge line 11b (top part) of a portion curved (curled) by swaging process of the end portion 11a of the cathode can 11.

Figure 7:
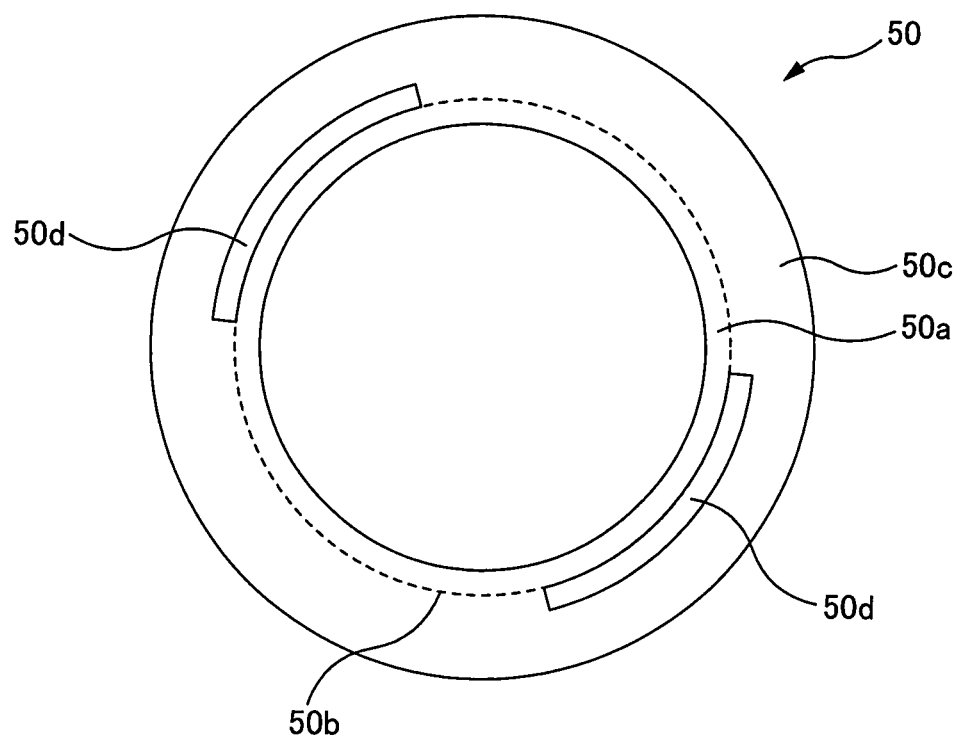
FIG. 7 is a plan view illustrating a washer 50 of Type 2.
Figure 8:
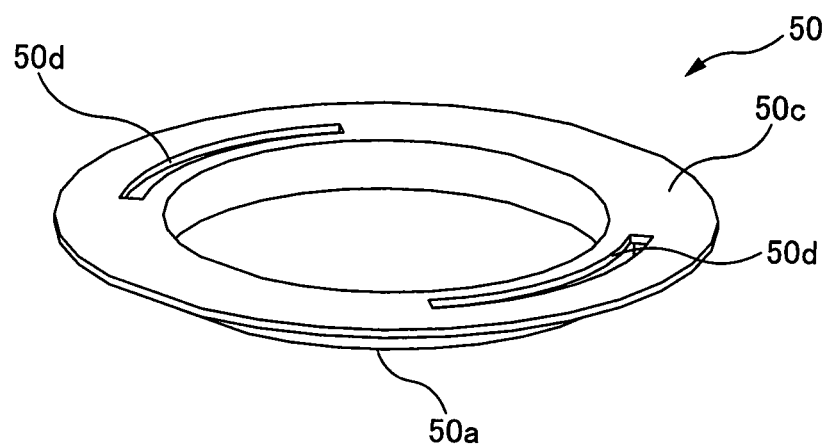
FIG. 8 is a perspective view illustrating a washer 50 of Type 2.

FIGS. 7 and 8 illustrate another structure of the washer 50 (hereinafter, also referred to as Type 2). FIG. 7 is a plan view illustrating the washer 50 when seen from the direction of the opening of the cathode can 11, and FIG. 8 is a perspective view illustrating the washer 50. As illustrated in these drawings, two of the vent holes 50d, which extend with a predetermined length along the outer peripheral surface 50b of the washer boss portion 50a, are provided in the flange portion 50c of the washer 50, at predetermined intervals (so as to be positioned at every 180 degrees around the cylindrical axis of the alkaline battery 1).

Figure 9:
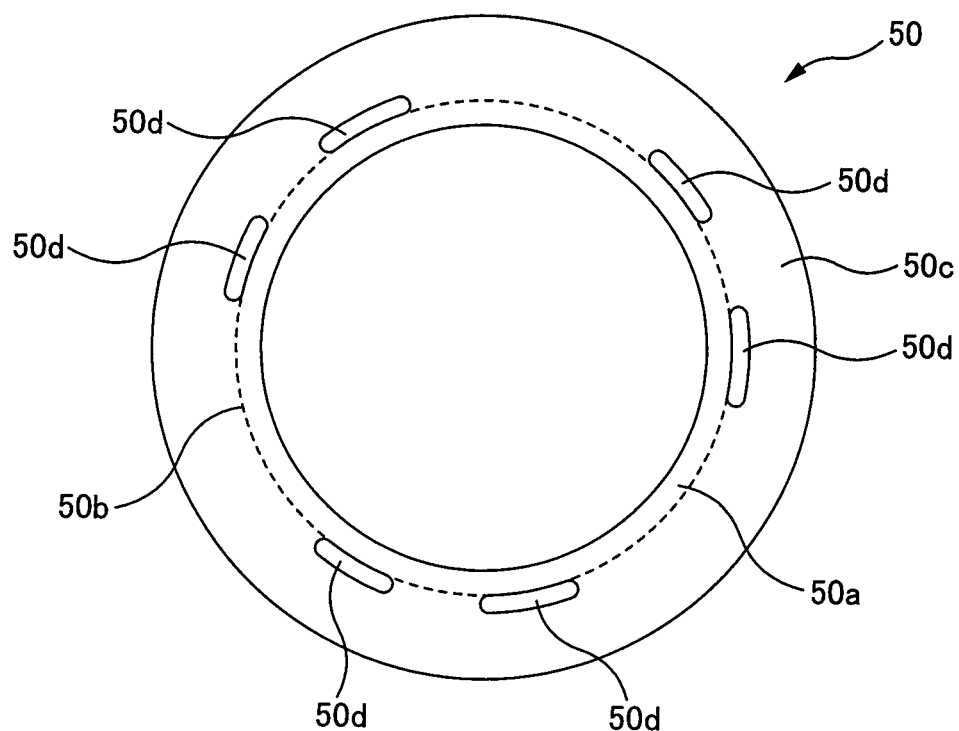
FIG. 9 is a plan view illustrating a washer 50 of Type 3.
Figure 10:
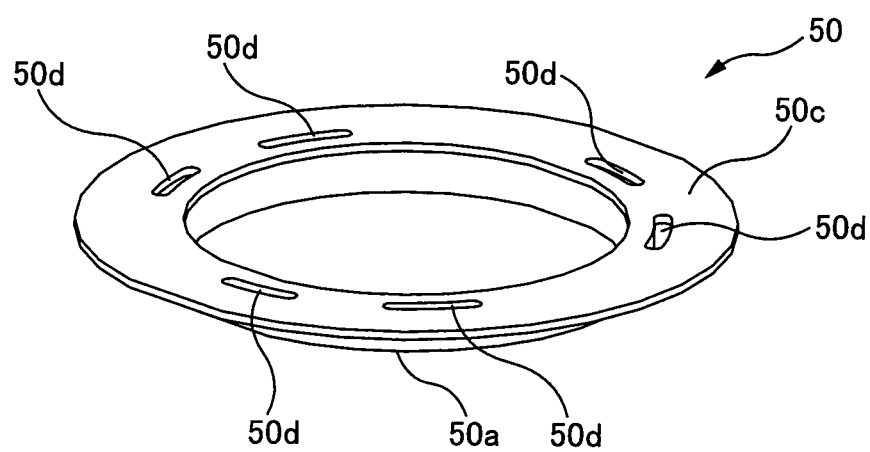
FIG. 10 is a perspective view illustrating a washer 50 of Type 3.

FIGS. 9 and 10 illustrate still another structure of the washer 50 (hereinafter, also referred to as Type 3). FIG. 9 is a plan view illustrating the washer 50 when seen from the direction of the opening of the cathode can 11, and FIG. 10 is a perspective view illustrating the washer 50. As illustrated in FIGS. 9 and 10, six of the vent holes 50d extending with a predetermined length along the outer peripheral surface 50b of the washer boss portion 50a are provided in the flange portion 50c of the washer 50, at predetermined intervals (three pairs of two vent holes 50d adjacent to each other are positioned at every 120 degrees around the cylindrical axis of the alkaline battery 1).

As described above, in the alkaline battery 1 according to an embodiment of the present disclosure, the vent holes 50d are formed in the flange portion 50c of the washer 50, and thus even in a case where a large amount of gas is generated inside the battery for some reason, the washer 50 can be reliably prevented form coming off.

Incidentally, only from such a point of view that the gas generated inside the alkaline battery 1 is to be efficiently released outside, the larger the area of the vent hole 50d, the more preferable. However, if the area of the vent hole 50d is excessively increased, the ease of forming and/or the certainty of forming (yield) deteriorates. Thus, in order to find an optimal range of the area of the vent hole 50d in the washer 50, a relationship is tested among the area of the vent hole 50d of the washer 50, a formed (molded) state of the washer 50 by injection molding, and a detachment state of the washer 50 when a large amount of gas is generated.

<Test 1>

In Test 1, using the above described washers 50, samples of the alkaline battery 1 of a plurality of types, in which the area of the vent hole 50d of the washer 50 is varied, are prepared, and the relationship is tested among the area of the vent hole 50d of the washer 50, a formed state of the washer 50 by injection molding, and a detachment state of the washer 50 when a large amount of gas is generated. A plurality of samples (30 pieces) are produced for each of the above types. Further, in the samples of each of the types, the samples including the washers 50 of Types 1 to 3 are mixed.

The formed state of the washer 50 is determined by testing the presence or absence of a weld and/or a short shot and the number thereof. The detachment state of the washer 50 is tested by charging a constant current (150 mA) to a sample of the alkaline battery 1.

Table 1 illustrates the results of Test 1. In the table, "Area of Vent Hole (%)" indicates the rate (%) of the gross area (projected area) of the vent hole (s) 50d of the washer 50 when the opening portion of the cathode can 11 is seen in the direction of the cylindrical axis of the cathode can 11, with respect to the area (projected area) of a planar region surrounded by the circular ridge line 11b (top part) of the curved (curled) portion of the end portion 11a in the cathode can 11 and the peripheral side surface 32b of the anode terminal plate 32, when the cathode can 11 is seen in the cylindrical axis direction. "Rate of Detached Washers" indicates the rate of the samples, in which detachment of the washer 50 is confirmed, with respect to the total number (30 pieces). "Formed state of Washer" is a formed state of the washer 50, and "Good" is entered when no weld or short shot is confirmed in any of the samples (in the case where the formed state is preferable), "Fair" is entered when a state between a weld and a short shot is confirmed in at least one sample, and "Poor" is entered when the satisfying washer 50 cannot be created by injection molding.

TABLE 1

| Area of Vent Hole (%) | Rate of Detached Washers | Formed state of Washer |
|---|---|---|
| 30 | — | Poor |
| 25 | — | Poor |
| 20 | 0/30 | Fair |
| 15 | 0/30 | Fair |
| 8 | 0/30 | Good |
| 7 | 0/30 | Good |
| 6 | 2/30 | Good |
| 3 | 6/30 | Good |
| 0 | 15/30 | Good |

As illustrated in Table 1, when the area of the vent holes 50d of the washer 50 is equal to or greater than 7%, the number of the detached washers 50 results in 0. Especially, when the area of the vent holes 50d of the washer 50 is from 7% to 8%, the formed state of the washer 50 is also preferable. The area of the vent holes 50d is equal to or greater than 15%, a state between a weld to a short shot was confirmed in a part of the samples. The reason for this can be considered such that the presence of the vent holes 50d disturbs a flow of a resin. When the area of the vent holes 50d is equal to or greater than 25%, the satisfactory washer 50 cannot be produced.

From the above, it is confirmed that with structures of Types 1 to 3 of the washer 50, the ease of forming as well as certainty (yield) of forming of the washer 50 can be secured, and also the washer 50 can be restrained from being detached. Especially, the area of the vent holes 50d of the washer 50 within a range from 7% to 20% can reliably prevent the detachment of the washer 50 while securing the ease of molding as well as the certainty (yield) of molding. Further, it is also confirmed that the area of the vent holes 50*d* of the washer 50 of from 7% to 8% can further secure the ease of forming as well as the certainty (yield) of forming of the washer 50.

=Other Embodiments of Washer 50=

In the above washers 50 of Types 1 to 3, the vent hole 50*d* is provided in the flange portion 50*c*, however, a structure of the washer 50 may be, for example, such a structure as follows.

Figure 11:
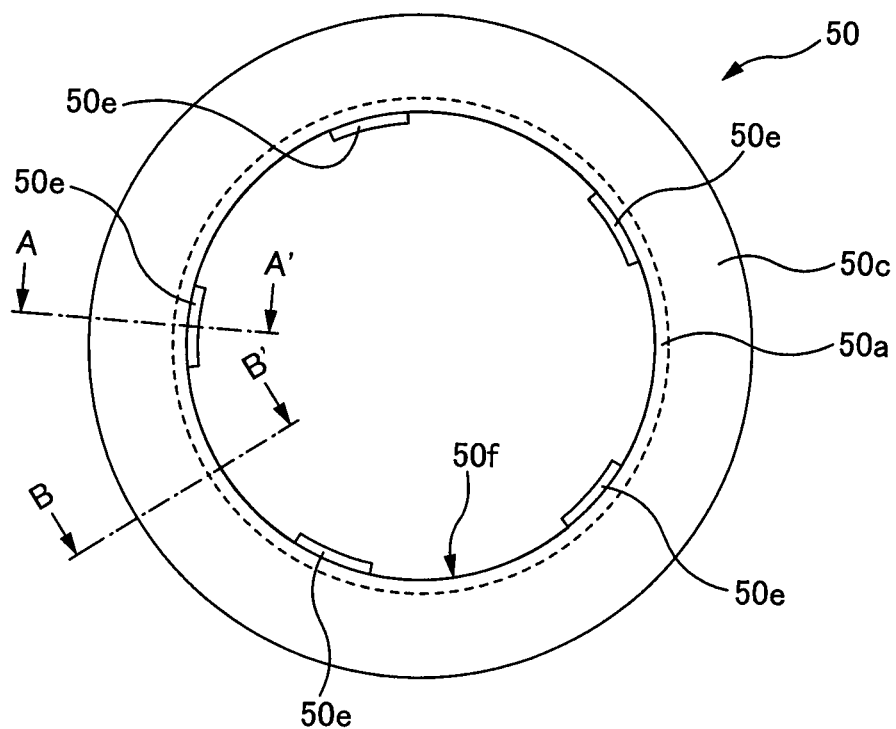
FIG. 11 is a plan view illustrating a washer 50 of Type 4.
Figure 12:
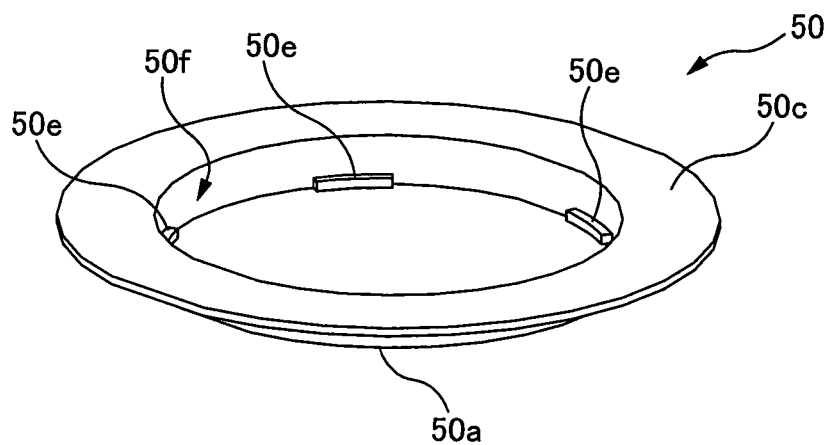
FIG. 12 is a perspective view illustrating a washer 50 of Type 4.

FIGS. 11 and 12 illustrate another structure of the washer 50 (hereinafter, referred to as Type 4). FIG. 11 is a plan view illustrating the washer 50 of Type 4 when seen from the opening of the cathode can 11, and FIG. 12 is a perspective view illustrating the washer 50 of Type 4.

As illustrated in these drawings, in this example, five protruding parts 50*e* extending with a predetermined length along the inner peripheral surface 50*f* are provided near the bottom portion of an inner peripheral surface 50*f* of the washer boss portion 50*a*, at predetermined intervals (such that five protruding parts 50*e* are positioned at every 72 degrees around the cylindrical axis of the alkaline battery 1. Note that the number of the protruding parts 50*e* is not limited thereto, as long as the formability of the washer 50 is not disturbed. Further, the protruding parts 50*e* are not necessarily provided near the bottom portion of the inner peripheral surface 50*f* of the washer boss portion 50*a*. The protruding parts 50*e* may be provided, at another height, on the inner peripheral surface 50*f* of the washer boss portion 50*a*, as long as the gas release efficiency and the formability of the washer 50 does not greatly deteriorate.

Figure 13A:
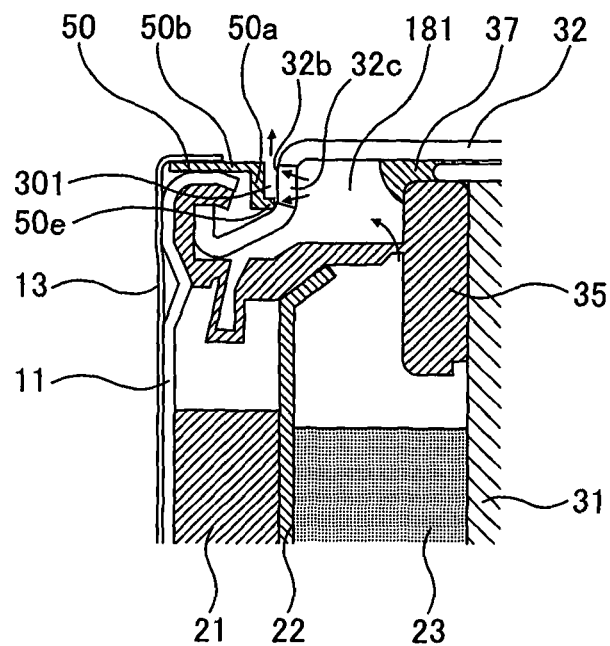
FIG. 13A is an enlarged partial cross-sectional view illustrating a washer 50 of Type 4 taken along line A-A' of FIG. 11.
Figure 13B:
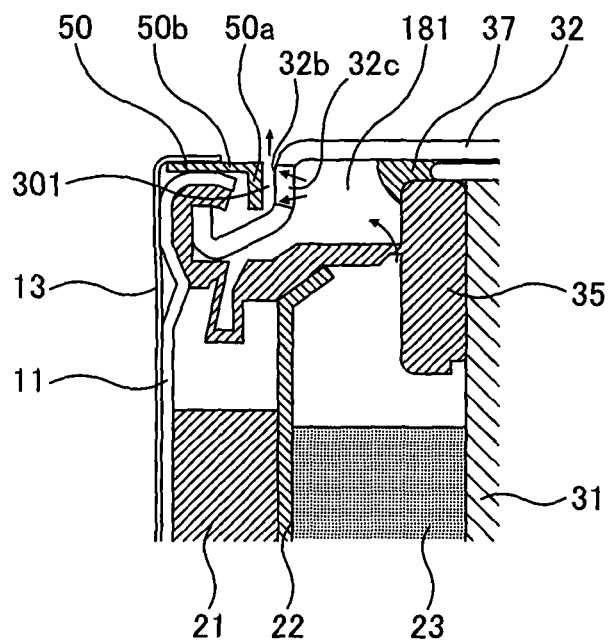
FIG. 13B is an enlarged partial cross-sectional view illustrating a washer 50 of Type 4 taken along line B-B' of FIG. 11.

FIG. 13A is an enlarged partial cross-sectional view illustrating the washer 50 of Type 4, in a state mounted to the opening portion of the cathode can 11, taken along line A-A' of FIG. 11. FIG. 13B is an enlarged partial cross-sectional view illustrating the washer 50 of Type 4, in a state mounted to the opening portion of the cathode can 11, taken along line B-B' of FIG. 11.

As illustrated in these drawings, in both a part where the protruding parts 50*e* are provided and a part where the protruding parts 50*e* are not provided, a gap 301 is formed between the inner peripheral surface 50*f* of the washer boss portion 50*a* and the peripheral side surface 32*b* (vent hole 32*c*) of the anode terminal plate 32. Thus, the gas to be released from the vent hole 32*c* of the anode terminal plate 32 can efficiently be released from the gap 301.

Figure 14:
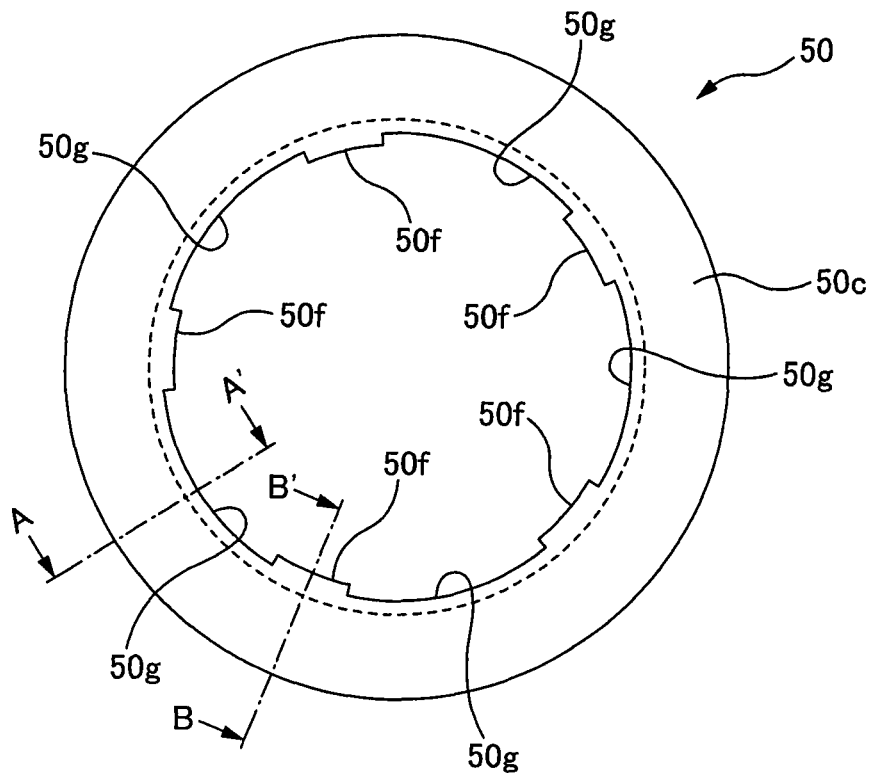
FIG. 14 is a plan view illustrating a washer 50 of Type 5.
Figure 15:
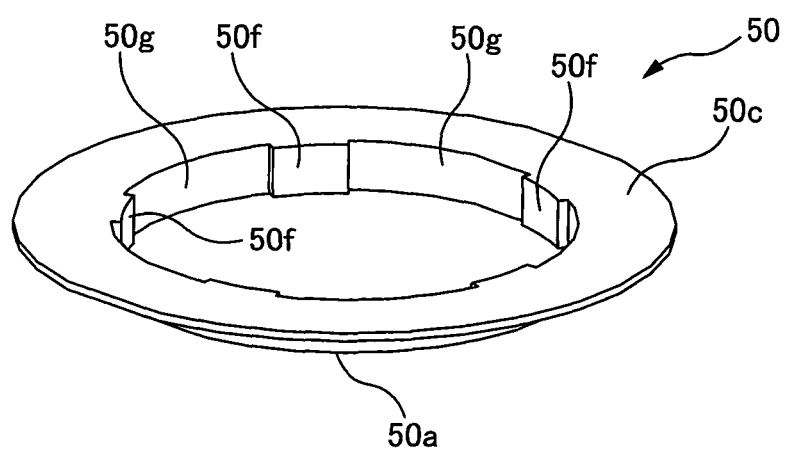
FIG. 15 is a perspective view illustrating a washer 50 of Type 5.

FIGS. 14 and 15 illustrate still another structure of the washer 50 (hereinafter, referred to as Type 5). FIG. 14 is a plan view illustrating the washer 50 of Type 5 when seen form the opening of the cathode can 11, and FIG. 15 is a perspective view illustrating the washer 50 of Type 5.

As illustrated in these drawings, in this example, five recessed parts 50*g* extending with a predetermined length along the inner peripheral surface 50*f* are provided on the inner peripheral surface 50*f* of the washer boss portion 50*a*, at predetermined intervals (such that the five recessed parts 50*g* are positioned at every 72 degrees around the cylindrical axis of the alkaline battery 1). Note that the number of the recessed parts 50*g* is not limited thereto, as long as the gas release efficiency and the formability of the washer 50 do not greatly deteriorate.

Figure 16A:
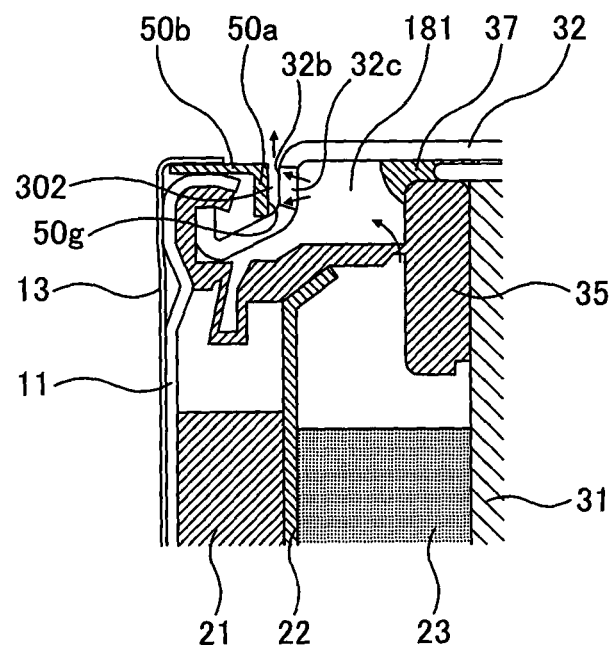
FIG. 16A is an enlarged partial cross-sectional view illustrating a washer 50 of Type 5 taken along line A-A' of FIG. 14.
Figure 16B:
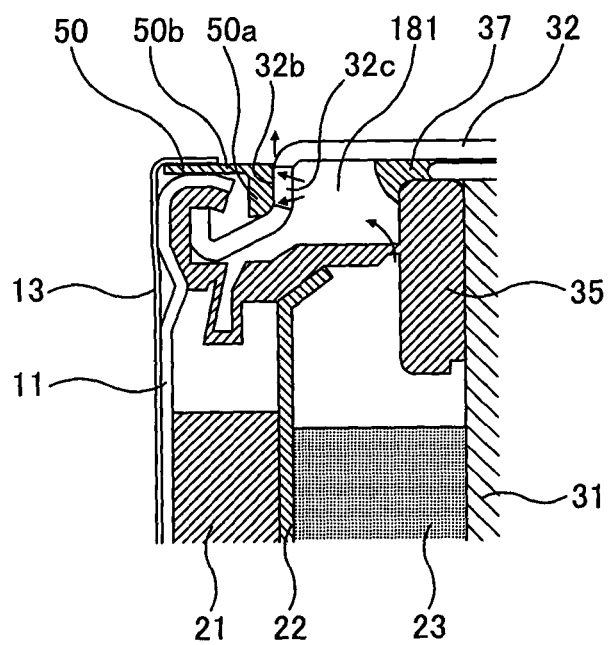
FIG. 16B is an enlarged partial cross-sectional view illustrating a washer 50 of Type 5 taken along line B-B' of FIG. 14.
Figure 17:
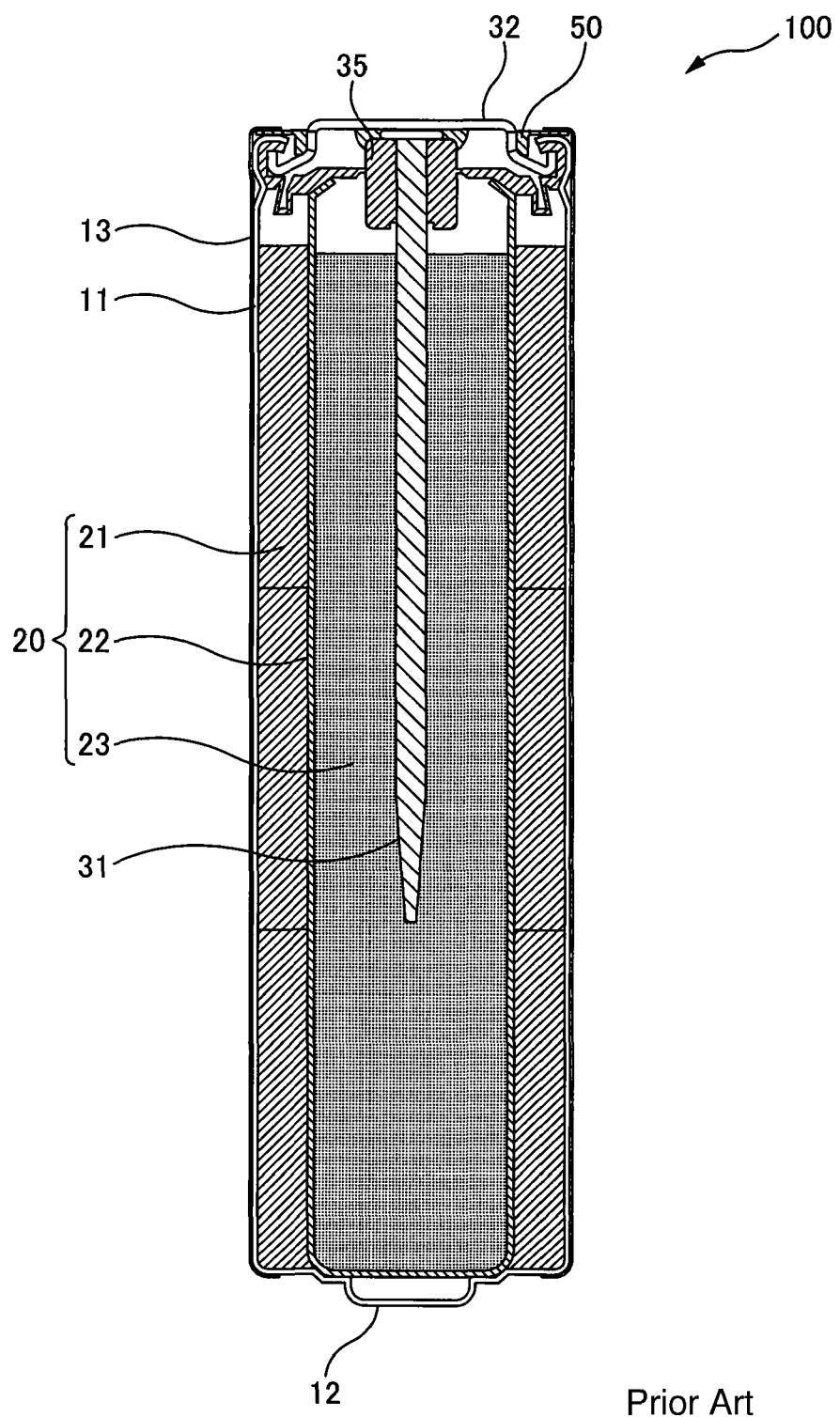
FIG. 17 is a diagram illustrating a structure of an alkaline battery 100.
Figure 18:
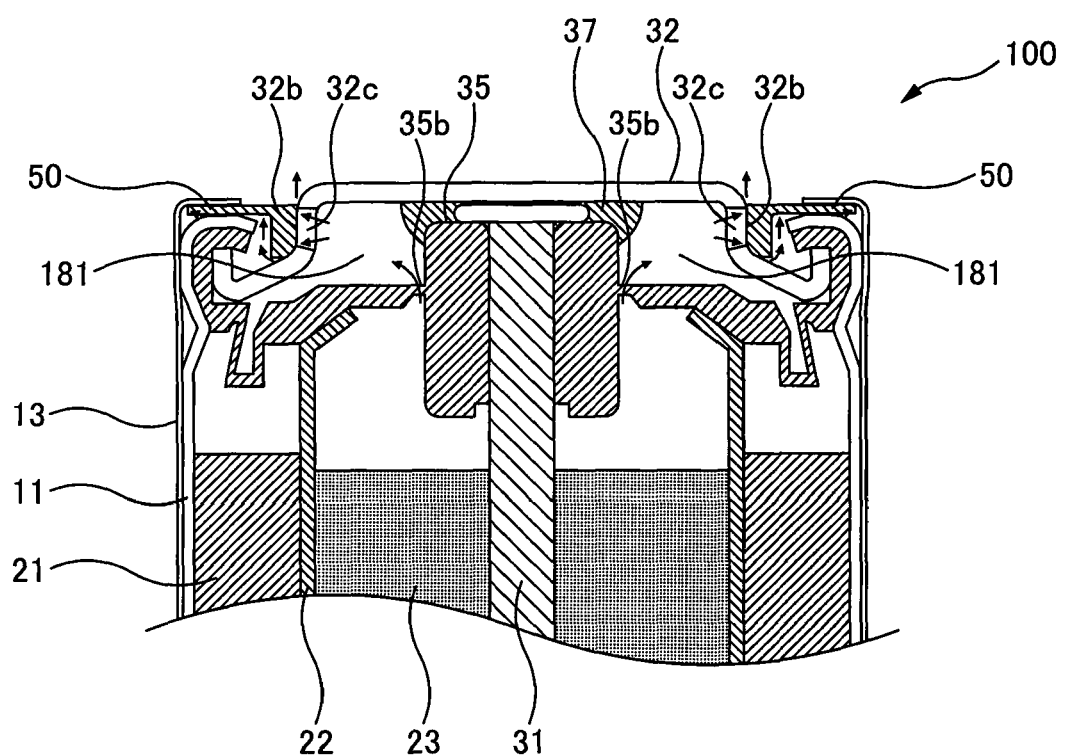
FIG. 18 is an enlarged partial cross-sectional view illustrating an anode terminal plate and therearound of an alkaline battery 100.
Figure 19:
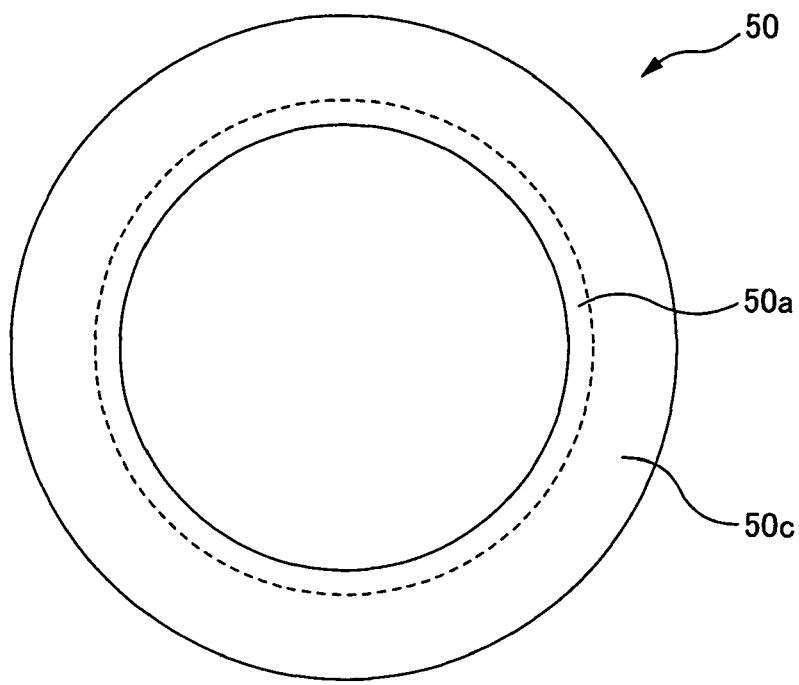
FIG. 19 is a plan view illustrating a washer 50.
Figure 20:
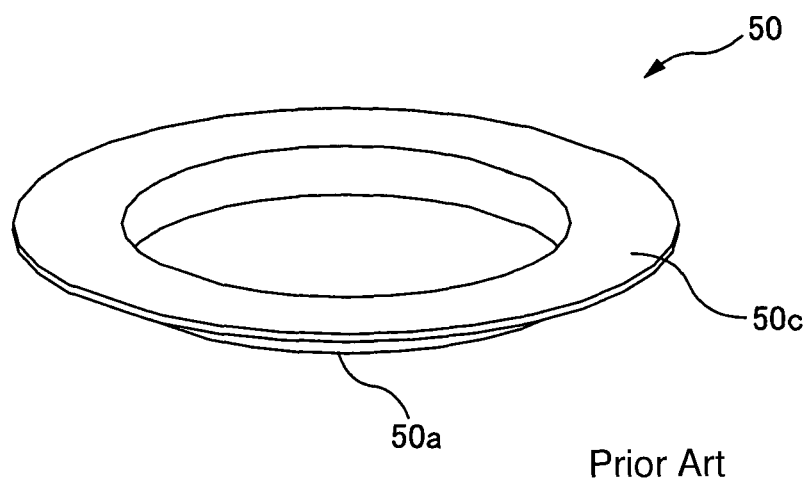
FIG. 20 is a perspective view illustrating a washer 50.

FIG. 16A is an enlarged partial cross-sectional view illustrating the washer 50 of Type 5, in the state mounted to the opening of the cathode can 11, taken along line A-A' of FIG. 14. FIG. 16B is an enlarged partial cross-sectional view illustrating the washer 50 of Type 5, in the state mounted to the opening of the cathode can 11, taken along line B-B' of FIG. 14.

As illustrated in these drawings, in a part where the recessed parts 50*g* are provided, a gap 302 is formed between the inner peripheral surface 50*f* of the washer boss portion 50*a* and the peripheral side surface 32*b* of the anode terminal plate 32 (vent hole 32*c*). Thus, the gas to be released from the vent hole 32*c* of the anode terminal plate 32 can efficiently be released from the gap 302.

Note that a length at which the recessed parts 50*g* extend, intervals at which the recessed parts 50*g* are provided along the inner peripheral surface 50*f* of the washer boss portion 50*a*, and the number of the recessed parts 50*g*, are preferably set such that at least any one of the recessed parts 50*g* is to face the position of the vent hole 32*c* of the anode terminal plate 32 without fail, even if the washer 50 is mounted at any angle around the cylindrical axis of the alkaline battery 1.

<Test 2>

Subsequently, samples of the alkaline battery 1 are prepared using the washers 50 of Type 4 and Type 5, and a formed state of the washer 50 by injection molding and a detachment state of the washer 50 when a large amount of gas is generated are tested. Three types of samples are prepared, in which the area of gap (%) (which will be described later) is varied (samples (30 pieces) are prepared for each of the types). Note that, the area of gap (%) indicates the rate (%) of the area (projected area) of the gap(s) formed between the peripheral side surface of the dish-shaped portion of the anode terminal plate 32 and the inner side surface (the inner peripheral surface 50*f* in the case of Type 4 and the recessed portion 50*g* in the case of Type 5) of the washer boss portion 50*a* of the washer 50, when the opening portion of the cathode can 11 is seen in the cylindrical axis direction of the cathode can 11, with respect to the are (projected area) of a planar region surrounded by a circular (annular) ridge line 11*b* of the curved end portion of the cathode can 11, when the opening portion of the cathode can 11 is seen in the cylindrical axis direction.

The evaluation of the formed state of the washer 50 is made similarly to the method of Test 1. Further, the detachment state of the washer 50 is tested similarly to the method of Test 1. Note that, in samples with the area of gap (%) of 5%, samples having the washers 50 of Types 4 and 5 are mixed. Table 2 illustrates the results of Test 2.

TABLE 2

| Area of Gap (%) | Rate of Detached Washers | Formed State of Washer |
|---|---|---|
| 8 (Type 4) | 0/30 | Good |
| 6 (Type 5) | 0/30 | Good |
| 5 | 3/30 | Good |

As illustrated in Table, when the area of gaps (%) is equal to or greater than 6%, the number of the detached washers 50 results in 0 in both Types 4 and 5. The reason for this can be considered such that, in the washers 50 of both Types 4 and 5, since the area of gap (%) is equal to or greater than 6%, the gas generated inside the battery is efficiently released outside from the gap 301 or gap 302. Whereas, when the area of gap (%) is 5%, the detachment of the washer 50 is confirmed in 3 out of 30 samples. Note that a weld or a short shot in the washer 50 is not confirmed in any of the samples, and the formed states thereof are preferable. This can be considered such that since no hole (vent hole) is present in the flange portion 50*c*, a resin flows around smoothly.

From the above, it is confirmed that with structures of Types 4 and 5 of the washer 50, the detachment of the washer 50 can reliably be restrained while the ease of forming as well as the certainty (yield) of forming of the washer 50 are being secured. Especially, the area of gap (%) of 6% or more can reliably restrain the detachment of the washer 50, while securing the ease of forming as well as the certainty (yield) of forming of the washer 50.

Incidentally, the above embodiments of the present disclosure are simply for facilitating the understanding of the present disclosure and are not in any way to be construed as limiting the present disclosure. The present disclosure may variously be changed or altered without departing from its spirit and encompass equivalents thereof.

For example, the present disclosure can widely be applied to other types of batteries, such as a manganese battery, in which a battery can is used as a current collector.

What is claimed is:

1. A cylindrical battery, comprising:
   a bottomed cylindrical battery can in which power generation elements are placed;
   a terminal plate having an appearance of a substantially dish shape, the terminal plate having an end portion formed on its periphery;
   a sealing gasket having an end portion formed on its periphery; and
   a washer made of a material having insulating properties,
   the sealing gasket being provided below the terminal plate when an opening of the battery can is placed upward,
   the terminal plate and the sealing gasket being provided to the opening of the battery can, with the end portions of the terminal plate and the sealing gasket being subjected to a swaging process together with an end portion of the battery can,
   the terminal plate including a peripheral side surface of a dish-shaped portion thereof, the battery can including the end portion curved, by the swaging process, to a direction of a cylindrical axis of the battery can, the peripheral side surface and the end portion of the battery can forming a gap therebetween,
   the washer including a cylindrical boss portion and an annular flange portion provided to a periphery of an upper end surface of the cylindrical boss portion, the washer being mounted to an opening portion of the battery can with the cylindrical boss portion being fitted into the gap,
   the terminal plate including the peripheral side surface having a portion facing the gap, the portion facing the gap having formed therein a first vent hole to release gas in a space between the terminal plate and the sealing gasket,
   the battery can including the end portion having an edge portion curved slightly downward by the swaging process,
   the washer including a vent structure provided in a state where the washer is mounted to the opening portion of the battery can, the vent structure being configured to release gas flowing from the first vent hole to the gap, to an exterior of the cylindrical battery from an annular gap formed between the inner peripheral surface of the cylindrical boss portion and the terminal plate,
   the washer includes, as the vent structure, a protruding portion formed on the inner peripheral surface of the cylindrical boss portion, such that the annular gap is formed between the inner peripheral surface of the cylindrical boss portion and the terminal plate, with the protruding portion contacting the peripheral side surface of the terminal plate, the peripheral side surface having formed therein the first vent hole.

2. The cylindrical battery according to claim 1, wherein a gross area of the second vent hole when the opening portion of the battery can is seen in a direction of the cylindrical axis of the battery can, is from 7 to 20% of an area of a planar region surrounded by the circular ridge line of the curved end portion of the battery can and the peripheral side surface of the terminal plate, when the opening portion of the battery can is seen in the direction of the cylindrical axis.

3. The cylindrical battery according to claim 1, wherein the washer includes a plurality of protruding portions provided, at predetermined intervals, along the inner peripheral surface of the cylindrical boss portion, the protruding portion including the plurality of protruding portions.

4. The cylindrical battery according to claim 1, wherein
   the washer includes, as the vent structure, a recessed portion formed on the inner peripheral surface of the boss portion.

* * * * *